(12) United States Patent
Cobler

(10) Patent No.: US 11,997,998 B2
(45) Date of Patent: Jun. 4, 2024

(54) INSECT CONTROL VESSEL AND DELIVERY DEVICE

(71) Applicant: Woodstream Corporation, Lancaster, PA (US)

(72) Inventor: David Fletcher Cobler, Etters, PA (US)

(73) Assignees: Woodstream Corporation, Lancaster, PA (US); ICB Pharma Tomasz Swietoslawski, Pawel Swietoslawski Spolka Jawna, Jaworzno (PL)

( * ) Notice: Subject to any disclaimer, the term of this patent is extended or adjusted under 35 U.S.C. 154(b) by 0 days.

(21) Appl. No.: 17/842,199

(22) Filed: Jun. 16, 2022

(65) Prior Publication Data

US 2023/0404052 A1    Dec. 21, 2023

(51) Int. Cl.
*A01M 1/02*    (2006.01)
*A01M 1/10*    (2006.01)

(52) U.S. Cl.
CPC ............. *A01M 1/02* (2013.01); *A01M 1/10* (2013.01)

(58) Field of Classification Search
CPC ........ A01M 1/02; A01M 1/10; A01M 1/2005; A01M 1/103; A01M 1/106; B65D 75/5811; B65D 75/324
USPC ................................ 43/107, 131, 132.1, 133
See application file for complete search history.

(56) References Cited

U.S. PATENT DOCUMENTS

| | | | | |
|---|---|---|---|---|
| 4,739,928 A | * | 4/1988 | O'Neil | A61L 9/127 239/45 |
| 5,237,774 A | * | 8/1993 | Warner | A01M 1/2005 43/131 |
| 5,839,221 A | * | 11/1998 | Ron | A01M 1/14 43/132.1 |
| 7,712,248 B2 | * | 5/2010 | Beroza | A01M 1/02 43/132.1 |
| 2004/0055207 A1 | * | 3/2004 | Beroza | A01M 1/2044 43/131 |
| 2008/0196296 A1 | * | 8/2008 | Studer | A01M 1/14 43/107 |
| 2008/0263938 A1 | * | 10/2008 | Schneidmiller | A01M 1/106 43/122 |
| 2014/0283436 A1 | * | 9/2014 | Picas Meya | A01M 1/2011 43/131 |
| 2014/0338251 A1 | * | 11/2014 | King | A01M 1/02 43/131 |
| 2019/0110457 A1 | * | 4/2019 | Willert | A01M 1/02 |

* cited by examiner

*Primary Examiner* — Joshua J Michener
*Assistant Examiner* — Nicole Paige Maccrate
(74) *Attorney, Agent, or Firm* — Barley Snyder

(57) ABSTRACT

A liquid insect bait system comprises an insect bait container including a housing defining an internal cavity holding a quantity of liquid bait, and an insect trap having an external housing. The housing of the insect trap includes an internal bait reservoir sized to hold bait received from the bait container, and an insect opening formed through the housing and in communication with the bait reservoir. A bait container opening is formed in housing and is sized to receive a portion of a bait holding container in an insertion direction. A portion of the bait container opening is in communication with the bait reservoir.

18 Claims, 6 Drawing Sheets

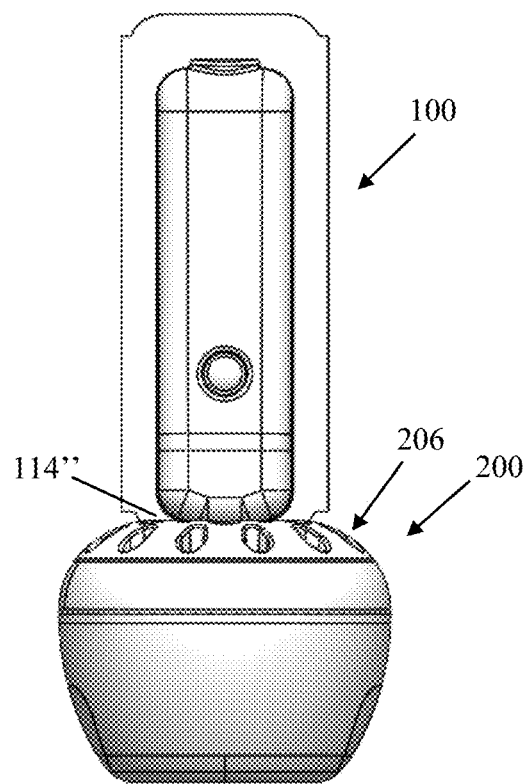
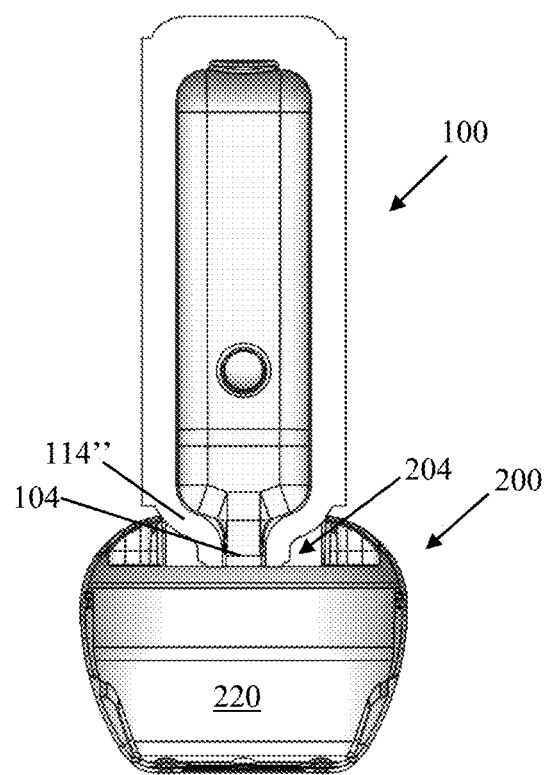
Figure 9
Figure 10

INSECT CONTROL VESSEL AND DELIVERY DEVICE

FIELD OF THE INVENTION

The present disclosure relates to fluid containers, and more particularly, to a vessel for engaging with a mono-dose container and receiving liquid therefrom.

BACKGROUND

When dispensing fluid from a container, such as toxic liquid bait used for insect or pest control, it is desirable to easily control the amount of fluid expelled from the container and/or ensure that the container may be fully emptied in an easy manner by a user. For example, in the case of mono-dose containers or packages, fluid contained therein is typically expelled by manually compressing or squeezing the container. Excessive compression of the container, however, can result in its plastic deformation, which may limit further control of, and/or prevent, further expulsion of the fluid. This may be particularly problematic when the container does not include, for example, a vent allowing the container to expel fluid under only the force of gravity.

Further, it is desired to minimize spillage or leakage of the fluid as it is dispensed into, for example, another container such as an insect trap or vessel. This is particularly important when the liquid being dispensed is toxic, corrosive, or otherwise noxious.

Accordingly, improved systems and methods for transferring liquids between two types of containers in a clean and expedient manner are desired.

SUMMARY

According to an embodiment of the present disclosure, a liquid insect bait system comprises an insect bait container including a housing defining an internal cavity holding a quantity of liquid bait, and an insect trap. A housing of the insect trap includes an internal bait reservoir sized to hold bait received from the bait container, and an insect opening formed through the housing and in communication with the bait reservoir. A bait container opening is formed in housing and is sized to receive a portion of the insect bait container in an insertion direction. A portion of the insect bait container opening is in communication with the bait reservoir.

BRIEF DESCRIPTION OF THE DRAWINGS

The invention will now be described by way of example with reference to the accompanying Figures, of which:

FIG. 9 is a side view of the vessel and mono-dose container of the preceding figures in an inserted or engaged position or state;

FIG. 10 is a partial cross-sectional view of the vessel and mono-dose container of FIG. 9.

DETAILED DESCRIPTION OF THE EMBODIMENTS

Figure 1:
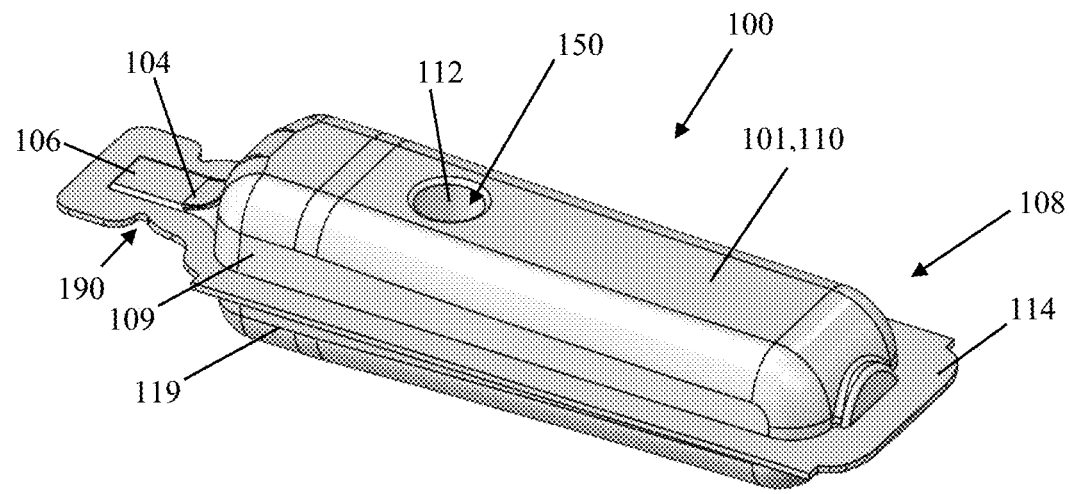
FIG. 1 is a perspective view of a mono-dose container according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a liquid holding vessel, such as an insect trap, adapted to hold a quantity of liquid, (e.g., liquid insect bait). The vessel is adapted to engage with and hold a liquid dispensing container during a dispensing operation. Specifically, a portion of the dispensing container is inserted into a complementary portion of the vessel that is in communication with an internal cavity thereof. The container has a fluid or liquid-containing cavity with at least one internal protrusion adapted to enable dispensing a liquid contained therein via compression, while preventing the cavity from being crushed. After inserting an open end of the container into the vessel, a user dispenses fluid from the container and into the vessel by compressing the container until engagement of the internal protrusion(s) and subsequently releasing the container in a repeating pumping action. As the open end of the container is received within and held by the vessel, spillage or leakage of the liquid during a filling operation is minimized or eliminated.

Referring generally to FIGS. 1-5, a container 100 according to an embodiment of the present disclosure is shown. The container 100 includes a housing or body 101 defining an internal cavity 102 (see FIG. 2). The internal cavity 102 is arranged in communication with an exit port or passageway 104. A break-away tab 106 is defined proximate an end of the passageway 104, and defines a segment of the housing 101 that is adapted to be removed (e.g., cut or torn by a user). Removal of the tab 106 opens a closed end of the passageway 104 and permits the flow of fluid from the internal cavity 102 to an external environment. In the exemplary embodiment, the container 100 comprises a polymer ampule or vessel formed by, for example, blow-molding a polymer film.

The housing 101 is defined by top and bottom walls 110,120 and associated integral sidewalls forming the internal cavity 102. The top and bottom walls 110,120 are adapted to be pressed together to reduce the volume of the internal cavity 102 for dispensing a liquid contained therein. More specifically, the housing 101 generally defines a first housing half 108 defining the top wall 110, and a second housing half 118 defining the bottom wall 120. The first and second housing halves 108,118 each define an at least partially vertical sidewall 109,119 extending circumferentially about the housing 101. The first and second housing halves 108,118 are joined at a shared joining wall or flange 114 defined about a lateral perimeter of the housing 101. The tab 106 is at least partially defined in the flange 114. A pair of notches 190 may be formed in the flange 114 in the area of the tab 106, promoting the tearing, breaking or cutting of the tab in the correct location prior to use.

The container 100 includes at least one anti-crushing feature adapted to prevent or limit the plastic deformation of the housing 101 by a user while dispensing the contained liquid. Specifically, as the container 100 does not include a vent or a breathing port, the primary means to efficiently dispense liquid from the internal cavity 102 includes compressing at least one of the top or bottom walls 110,120 of the housing 101, and preferably both walls toward one another. This at least partially collapses the internal cavity 102, reducing its volume and expelling the liquid via the open passage 104 via increased internal pressure. In order to ensure that a user can completely expel the liquid in the internal cavity 102, the container must enable a user to repeatedly compress the internal cavity in a pumping-like action. More specifically, the housing 101 is adapted to be only elastically deformed, or at least partially only elastically deformed, under a compressive expulsion force applied by a user. Upon release of the force, the housing 101, and more specifically its opposed top and bottom walls 110,120 thereof, is adapted to at least partially elastically return to its undeformed state (or the volume of the internal cavity 102 return to, or nearer to, its original uncompressed volume), drawing air back into the cavity.

In order to prevent excess plastic deformation (or any plastic deformation) of the housing 101, the container 100 includes at least one anti-crushing or anti-crush feature or structure 150. Specifically, in the exemplary embodiment, each of the opposing top and bottom walls 110,120 includes a respective protrusion 112,122 extending from the respective wall and into the internal cavity 102. As shown, the protrusions 112,122 extend in a direction generally toward one another in an uncompressed state of the housing 101. A predetermined gap or space 140 is defined between the protrusions 112,122 in the uncompressed state of the housing 101.

Deformation of the housing 101 causes relative motion between the top and bottom walls 110,120, reducing the size of the gap 140 in a direction(s) of compression C. After sufficient compression, ends of the protrusions 112,122 will engage with one another, limiting the deformation or compression of the housing 101 in the indicated direction. In this way, the size of the gap or space 140 between the protrusions 112,122 is selected to control the amount of fluid dispensed from the container 100, as well as mechanically limit the amount of deformation of the housing 101, for each compression cycle thereof (i.e., each pump or squeeze). The protrusions 112,122 enable a cyclic pumping operation of the container 100 in order ensure all of the fluid contained therein may be expelled.

Figure 4:
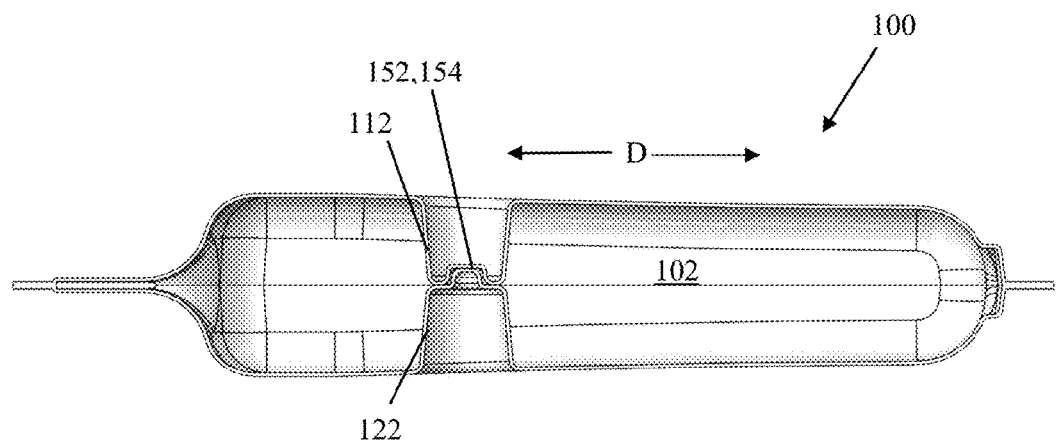
FIG. 4 is a side cross-sectional view of the mono-dose container of the preceding figures in a compressed state.

The protrusions 112,122 comprise complementary mating surfaces 152,154 defined on opposing ends thereof. The mating surfaces 152,154 are adapted to engage one another in the compressed state of the housing 101, as shown in FIG. 4. The engaged mating surfaces 152,154 include surfaces which oppose one another at least partially in at least one direction D normal to the directions of compression C of the housing 101. In this way, the engaged mating surfaces 152,154 prevents relative lateral motion of the protrusions 112,122 (or the walls 110,120, or the protrusions "slipping off" one another, under compressive force placed on the container 100 during use. In one embodiment, the engaged mating surfaces 152,154 prevent motion along a plane defined between the mating ends of the protrusions 112,120 (i.e., in all directions within the plane). In other embodiments, the engaged mating surfaces 152,154 prevent motion in at least two directions normal, or relative, to the generally vertical direction(s) of compression.

Figure 5:
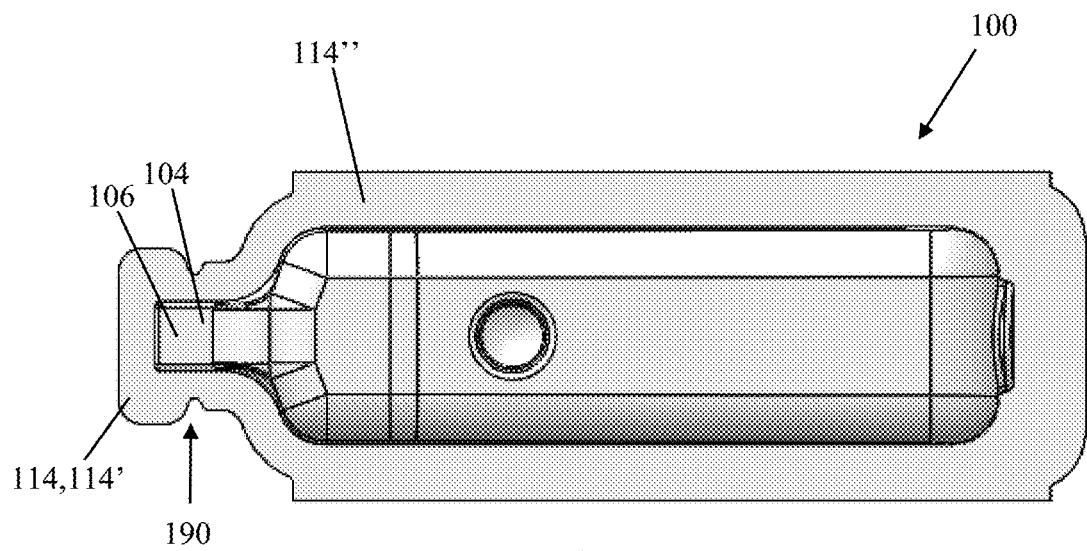
FIG. 5 is a top view of the mono-dose container of the preceding figures.

In the embodiment shown in FIGS. 1-5, the protrusions 112,122 comprise cylinders, or more specifically, tapered cylinders or cones, and the mating surfaces 152,154 comprise a generally cylindrical protrusion having a sidewall and a complementary cylindrical recess having an opposing sidewall, respectively. As shown in FIG. 5, the leading surfaces or edges of each of the surfaces 152,154 may be rounded so as to facilitate or guide the engagement of the features in use. In other embodiments, the mating surfaces may be domed shaped (i.e., complementary convex and concave shaped), by way of example.

In a preferred embodiment, the anti-crushing feature 150 is defined in a front of the housing 101, or toward a front of the housing, proximate the outlet passage 104 in a longitudinal direction of the housing. Further, the housing 101 of the container 100 comprises a generally tapered profile, with a cross-section of the internal cavity 102 being greater toward the front of the housing 101 as compared to a rear of the housing 101 opposite the passage 104. The anti-crushing feature(s) 150 are located centrally within the cavity 102 in a lateral direction of the housing 101, transverse to the longitudinal direction.

Figure 2:
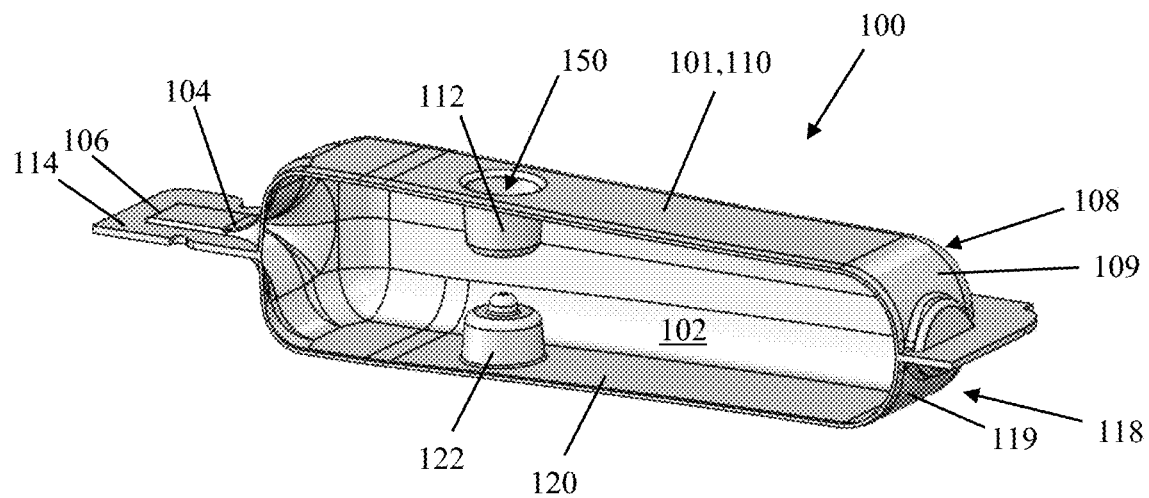
FIG. 2 is a perspective cross-sectional view of the mono-dose container of FIG. 1.
Figure 3:
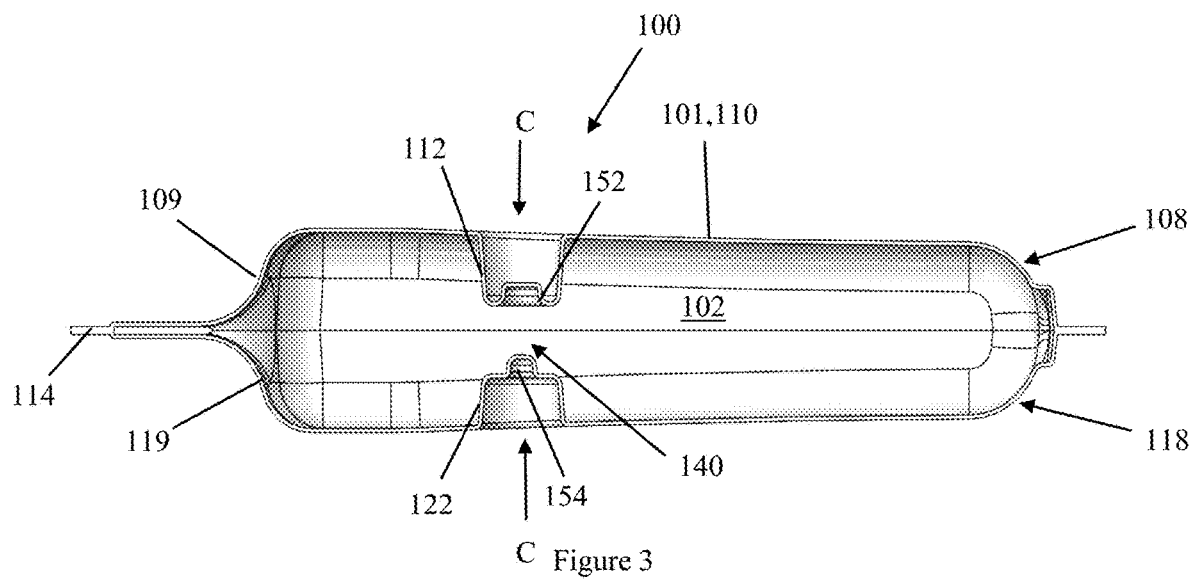
FIG. 3 is a side cross-sectional view of the mono-dose container of the preceding figures.

As set forth above, the housing 101 may be formed by a blow-molding process of manufacture. Specifically, each mirror-image housing halves 108,118 may by formed from a single sheet of polymer film to create the each half. The halves 108,118 are brought into abutment with one another and sealed to one another along a desired sealing line that corresponds with the interior circumferential edges the flange 114 of the housing 101. In one embodiment, an opening is left in the sealing line to provide a fluid input channel. The central area surrounded by the sealed outer edges that will form the internal cavity 102 is also unsealed. In one embodiment, a folded piece of film material sealed is then placed into a two-sided mold that is pre-formed to create the desired bait pack or housing shape including the inner contour of the internal cavity 102, as shown in FIGS. 2-4. Air and product are introduced through a circular feature at the rear of the product. The air forces each half 108,118 of the film material outwardly and into abutment with a respective inner side of the mold, forming the single sealed bait cavity 102 having the desired bait pack shape. Insecticide, for example, is then introduced into the internal cavity through the inlet passage 104, after which the tubular member is removed. The fluid inlet passage 104 and flange 114 are then sealed. When the device is ready for use, a neck portion of the inlet passage 104 projects from a remainder of the housing 101, and terminates in the tab portion 106, or beyond a line defined between the score(s) 190. A bait pack having differently shaped sides would be produced using a different pre-formed mold as would be understood by persons of ordinary skill in the art. However, it is preferred that the two halves 108,118 have an identical, or near identical, structure for greater ease and simplicity in manufacture.

Using a container according to the above-described embodiments of the present disclosure, a method of expelling fluid therefrom includes the step of elastically deforming the container to reduce an internal volume thereof. This step includes applying a pressing force to a first wall of the container in a direction toward a second wall of the container for reducing the relative distance between the first and second walls. This compression engages a feature formed on an interior of the first wall with or into a feature formed on an interior surface of the second wall, limiting relative movement of the first sidewall and the second sidewall in a plurality of directions. The method further includes the steps of releasing the pressing force applied to the first sidewall and permitting the container to elastically return to an at least partial undeformed state, and repeating the steps of elastically deforming the container and releasing the pressing force until a predetermined amount of fluid is expelled from the container.

Referring generally now to FIGS. 6-11, an embodiment of the present disclosure includes a vessel or insect trap 200 (e.g., a fruit fly trap) adapted to receive, by way of non-limiting example, the container 100 of FIGS. 1-5 at least partially therein. The vessel 200 is further adapted to hold the container 100 once engaged therein, and accept and retain fluid (i.e., toxic insect bait) expelled from the container via the above-described dispensing method.

Figure 6:
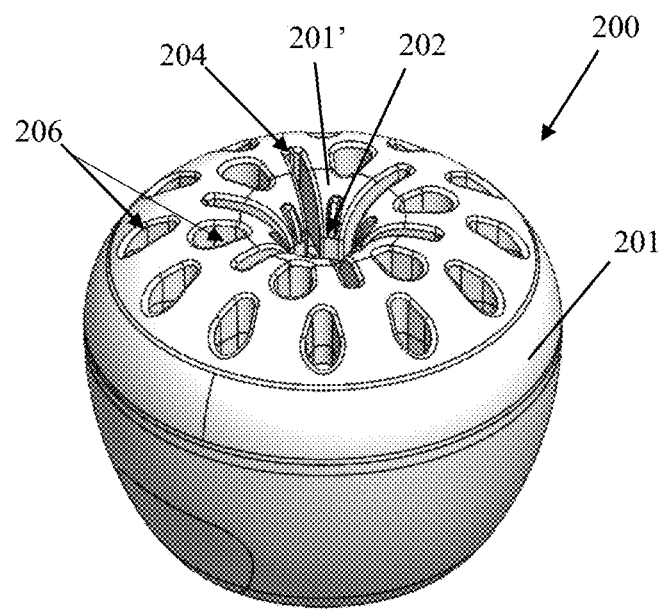
FIG. 6 is a perspective view of a vessel, or insect trap, according to an embodiment of the present disclosure for engaging with, and receiving liquid from, the mono-dose container of FIGS. 1-5.
Figure 7:
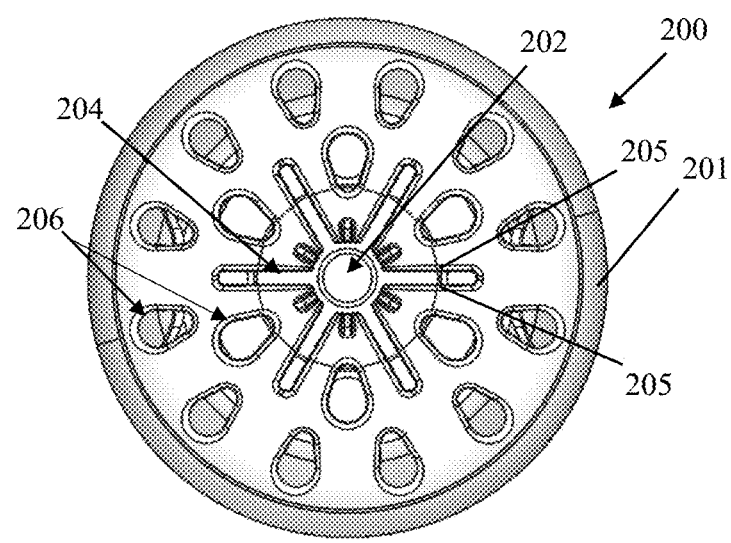
FIG. 7 is a top view of the vessel of FIG. 6.
Figure 11:
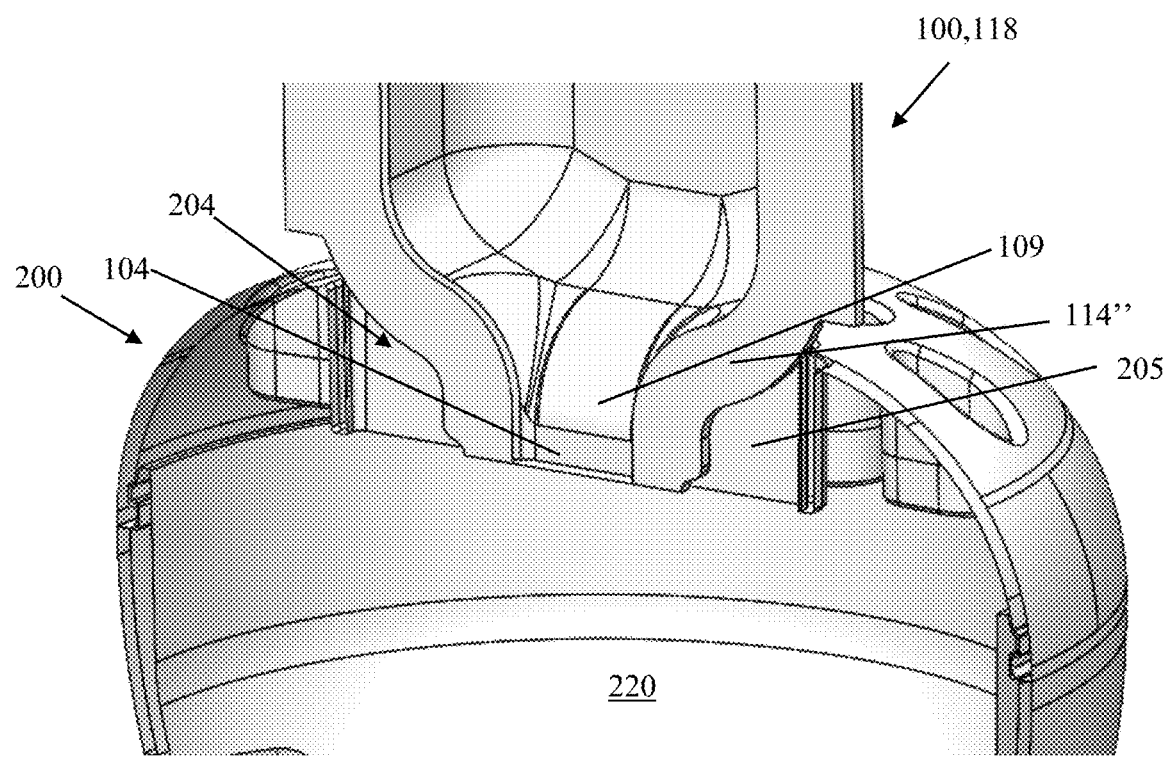
FIG. 11 is a cross-sectional perspective view of a portion of the vessel and mono-dose container according to the preceding figures in the inserted or engaged position.

As shown in FIGS. 6 and 7, the vessel 200 includes a body 201 defining central opening 202 in communication with an internal cavity 220 (see FIGS. 10 and 11). A plurality of slots or slot-shaped openings 204 are formed radially around the opening 202. Each slot 204 is defined by opposing radially extending walls 205. In the exemplary embodiment, the slots 204 include three slots equally radially spaced about the central opening 202. Each slot 204 is linear and passes through the central opening 202, with the opening bisecting each slot. Alternatively, this arrangement may be described as six radially-extending slots 204 equally spaced about the central opening 202. Pairs of the slots 204 are arranged opposite one another relative to the central opening 202 so as to define three continuous slots or openings bisected by the central opening 202. It should be understood that the number of slots 204 can be varied without departing from the scope of the present disclosure. As set forth in greater detail herein, each slot 204 is adapted (i.e., sized and shaped) to receive the front of the container 100, including the passage 104, for fixing the container relative to the vessel 200 during a filling operation.

The vessel 200 further includes a plurality of insect openings 206 formed through the housing 201 and in communication with, or opening into, the internal cavity 220. The openings 206 are adapted, or sized and shaped, to permit the passage of insects from an external environment and into the cavity 220 for accessing bait contained therein. In the exemplary embodiment, as shown in FIG. 7, the openings 206 are arranged uniformly and radially about the central opening 202 (i.e., spaced evenly in a radial direction). Specifically, the openings 206 are arranged in a first inner circular pattern or ring, with each opening 206 arranged between one of the slots 204, and a second outer circular pattern or ring. The openings 206 of the outer ring are arranged radially outward of the slots 204. Each opening 206 of the inner ring of openings is arranged generally between adjacent pairs of openings of the outer ring in a circumferential or radial direction about the central opening 202. The central opening 202 and the slots 204 together define a continuous opening having the shape of an asterisk (*), including six radially extending slot segments.

Figure 8:
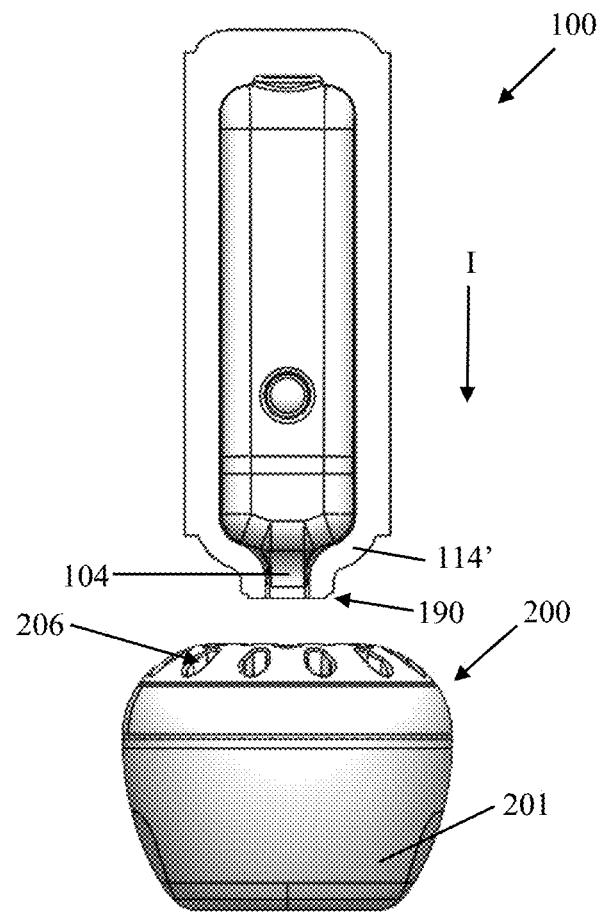
FIG. 8 is a side view of the vessel and mono-dose container of the preceding figures in a pre-insertion or pre-engagement position or state.

Referring now to FIGS. 8-11, mating of the exemplary container 100 and the vessel 200 is shown and described. With reference to FIG. 8, the container 100 is shown in a disengaged position relative to the vessel 200. The tab 106 of the container 100 has been removed, permitting insect bait (of other fluid) held within the container to be expelled through the passage 104 via the above-described process. The container 100 is aligned for insertion into the vessel 200, and more particularly, into one of the slots 204 thereof in an insertion direction I. With reference to FIGS. 9 and 10, a portion of the container 100 is shown in an inserted position, wherein a first end thereof is engaged within the vessel 200. More specifically, at least a front portion 114' of the flange 114 is received within one of the slots 204 in the insertion direction I. Insertion of the container 100 into the slot 204 positions the passage 104 into, or in close proximity with (e.g., directly adjacent), the internal cavity 220 of the housing 201. In one embodiment, the slot 204 and flange 114' are sized to create a friction fit as the container 100 is inserted. On other embodiments, a slip flit or clearance fit may also be used.

With the front or first end of the container 100 in the inserted position, a user may proceed with expelling the contents of the container 100 via the above-described pumping action. As the passage 104 or open end of the container 100 is arranged within the slot 204 or housing 201, embodiments of the present disclosure prevent spilling, leaking, or other loss of fluid during the filling process. This is achieved both by fixing the orientation of the container 100 relative to the vessel 200, as well as by at least partially sealing the passage 104 of the container 100 relative to the external environment. In this way, embodiments of the present disclosure include an accurate, efficient and sanitary means to fill the vessel 200. Further, the presence of multiple slots 204 enables a user to select between various radial insertion positions of the container 100 relative to the vessel 200. This may be particularly beneficial if the vessel 200 is in a difficult to access position, or is fixedly mounted. Further, the various insertion positions of the container 100 into the vessel 200 minimizes the required interaction of a user with the vessel (i.e., reduces necessary contact with the vessel by the user). During filling operations, the openings 206 act as vents, permitting air to be expelled as the internal cavity 220 is at least partially filled with liquid or bait.

The exemplary vessel 200 comprises a generally spherical shape, and more particularly, is shaped to mimic that of an apple. Specifically, an external surface of the body or housing 201 tapers downwardly toward the central opening 202 in a radially inward direction. In one embodiment, the internal shape or curvature of the slots 204 corresponds to a tapering or inwardly-curving (i.e., narrowing) portion 114" of the flange 114 of the container 100, for achieving a complementary fit between the container and vessel 200 in an inserted position. In other embodiments, the slots 204 may define generally linear (e.g., vertical) internal walls. A central section 201' of the housing 201 defining the central opening 202 may be removable from a remainder of the housing in an axial direction. It should be understood that the vessel may be sized and shaped in a variety of manners, and is not limited to the profile shown in the figures.

As shown in FIGS. 10 and 11, a width of the flange 114 proximate the front or first end of the container 100 is greater than a width of the slot 204. In this way, a mechanical stop is formed for setting or limiting an insertion depth of the container 100 into the vessel 200. The width of the slot 204, as well as its internal profile, in relation to a width and/or profile of the flange 114 of the container 100, are selected to ensure that the passage 104 is correctly positioned within the vessel 200, and more specifically, relative to the internal cavity 220 thereof. In one embodiment, the slots 204 are sized to permit the passage 104 to extend at least partially into the cavity 220. In other embodiments, the slots 204 are sized to place an end of the passage 104 at, or just above, the internal cavity 220. A diameter of the central opening 202 is at least equal to a width of the passage 104. Further, a portion of the sidewall 109 leading into the passage 104 tapers into the passage. An external surface of the tapering internal portion of the sidewall 109 is sized to fit within the central opening 202, such that the front end of the container is insertable into the vessel 200 in the illustrated manner.

In other embodiments of the present disclosure, one or more of the slots 204 may be sized differently (i.e., in width, thickness, and/or internal shape) than a remainder of the slots 204. In this way, the vessel 200 may be adapted to accept a plurality of different containers therein, with each slot corresponding in size and shape to one of the plurality of container types. In this way, accurate fit and sealing between the vessel 200 and one of a plurality of predetermined containers may be achievable. In other embodiments, the slots 204 may be arranged in different relative orientations beyond the radial arrangement shown. For example, the slots may be arranged in a mutually parallel manner (e.g., arranged in a row or column). In this embodiment, each slot would include its own central opening for receiving the passage of the container.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A liquid insect bait system, comprising:
    an insect bait container including a housing defining an internal cavity holding a quantity of liquid bait; and
    an insect trap having a housing defining:
        an internal bait reservoir sized to hold bait received from the bait container;
        an insect opening formed through a top wall of the housing and in communication with the bait reservoir;
        at least one slot formed through the top wall of the housing and slidably receiving a portion of a bait holding container in an insertion direction, a portion of the at least one slot in communication with the bait reservoir, the insect trap and the at least one slot adapted such that the bait container is slidably removable from the at least one slot and the trap; and
        a central opening sized to receive a portion of the container, the central opening defining an evacuation passage formed through the housing and in communication with the at least one slot.

2. The system of claim 1, wherein the container housing includes:
    two opposing walls defining the internal cavity, the opposing walls being elastically movable relative to one another between an uncompressed state of the container, and a compressed state of the container; and
    an anti-collapsing structure defined on each of the two opposing walls, the anti-collapsing structures of the two opposing walls contactingly engaging with one another in the compressed state of the container for limiting relative motion between the opposing walls in a plurality of directions.

3. The system of claim 2, wherein the two opposing walls are joined to form an exterior flange defined about a perimeter of the container, a bait passage in fluid communication with the internal cavity is defined at least partially through the flange.

4. The system of claim 3, wherein the at least one slot is sized to receive a portion of the flange and the bait passage therein with the container inserted into the at least one slot in a vertical direction.

5. The system of claim 4, wherein the at least one slot fixes a radial position of the container relative to the insect trap and maintaining the container in a vertical orientation within the at least one slot.

6. The system of claim 5, wherein the central opening is arranged midway along the at least one slot in a width direction.

7. The system of claim 6, wherein the at least one slot includes a plurality of slots spaced from one another in a radial direction about a central axis of the central opening.

8. The system of claim 7, wherein each of the plurality of slots is sized to receive the portion of the flange of the container, each slot of the plurality of slots corresponding to a distinct radial position of the container about the central axis with the container inserted into the trap.

9. The system of claim 8, wherein the plurality of slots comprise three slots centered and intersecting at the central opening.

10. The system of claim 2, wherein, with the anti-collapsing structures of the two opposing walls engaged in the compressed state of the container, surfaces of the anti-collapsing structures oppose each other in a plurality of directions.

11. The system of claim 5, wherein an end portion of the flange of the container defines a width less than a width of a first internal portion of the at least one slot in a direction transverse to the insertion direction.

12. The system of claim 11, wherein another portion of the flange of the container defines a width greater than a width of a second internal portion of the at least one slot in the direction transverse to the insertion direction, the at least one slot and the flange opposing one another in the insertion direction for limiting the insertion depth of the container into the trap.

13. The system of claim 5, further comprising a tab defined adjacent the bait passage and adapted to be removed by a user for opening the bait passage to the external environment.

14. The system of claim 5, wherein the at least one slot is defined by a plurality of slot walls extending from the top wall of the housing and into the internal cavity.

15. A liquid insect bait vessel, comprising:
a housing defining an internal cavity;
at least one insect opening extending through the housing and in communication with the internal cavity;
a slot formed through a top wall of the housing and in communication with the internal cavity, the slot adapted to slidably and removably receive a portion of a bait holding container in a direction of insertion, the slot including a plurality of slot walls defining a linearly extending opening in a width direction of the housing, the plurality of slot walls extending from the top wall of the housing and into the internal cavity; and
a central opening sized to receive a portion of the container, the central opening defining an evacuation passage formed through the housing and in communication with the slot.

16. The vessel of claim 15, further comprising a plurality of slots formed through the top wall of the housing, at least a portion of each slot in communication with the internal cavity.

17. The vessel of claim 15, wherein the slot includes a plurality of slots arranged radially about a central axis of the central opening, each of the slots in communication with the central opening.

18. The vessel of claim 15, wherein the central opening bisects the slot in a direction transverse to the direction of insertion of the container into the vessel.

\* \* \* \* \*